(12) United States Patent
Ou

(10) Patent No.: US 11,092,481 B2
(45) Date of Patent: Aug. 17, 2021

(54) INTEGRATED CIRCUIT (IC) INTEGRATED STRUCTURE FOR OPTICAL MOUSE COMPRISING A LIGHT SHIELD WITH A THROUGH HOLE FOR TRANSMITTING LIGHT ARRANGED BETWEEN AN OPTICAL LENS AND A MAIN CONTROL IC WAFER

(71) Applicant: Dongguan Ouyue Electronic Technology Co., Ltd, Dongguan (CN)

(72) Inventor: Jinfang Ou, Dongguan (CN)

(73) Assignee: Dongguan Ouyue Electronic Technology Co., Ltd, Dongguan (CN)

( * ) Notice: Subject to any disclaimer, the term of this patent is extended or adjusted under 35 U.S.C. 154(b) by 0 days.

(21) Appl. No.: 16/847,422

(22) Filed: Apr. 13, 2020

(65) Prior Publication Data

US 2021/0033454 A1 Feb. 4, 2021

(30) Foreign Application Priority Data

Jul. 30, 2019 (CN) .......................... 201921231959.0

(51) Int. Cl.
*G01G 1/42* (2006.01)
*G01J 1/42* (2006.01)
*G01J 1/02* (2006.01)
*G01J 1/06* (2006.01)
*G06F 3/0354* (2013.01)
*G02B 5/04* (2006.01)

(52) U.S. Cl.
CPC .............. *G01J 1/42* (2013.01); *G01J 1/0204* (2013.01); *G01J 1/06* (2013.01); *G06F 3/03543* (2013.01); *G02B 5/04* (2013.01)

(58) Field of Classification Search
CPC .. G06F 3/0317; G06F 3/03543; G01J 1/0204; G01J 1/06; G01J 1/42
USPC ................... 250/239, 214 AL, 216
See application file for complete search history.

(56) References Cited

U.S. PATENT DOCUMENTS 6,967,321 B2 * 11/2005 Leong ................... G06F 3/0317
250/239

\* cited by examiner

*Primary Examiner* — Que Tan Le
(74) *Attorney, Agent, or Firm* — Dragon Sun Law Firm, PC; Jinggao Li, Esq.

(57) ABSTRACT

An IC integrated structure for an optical mouse of the invention comprises a bracket configured for being connected with a PCB, an LED wafer for emitting light, a main control IC wafer and an optical lens; wherein the LED wafer and the main control IC wafer are respectively mounted at two ends of a terminal surface inside a bracket frame, the LED wafer and the main control IC wafer are connected with the PCB by the bracket, and the optical lens is mounted above the LED wafer and the main control IC wafer; a light shield configured for shielding an external light source is arranged between the optical lens and the main control IC wafer, and a through hole configured for transmitting light is formed in the light shield.

7 Claims, 2 Drawing Sheets

INTEGRATED CIRCUIT (IC) INTEGRATED STRUCTURE FOR OPTICAL MOUSE COMPRISING A LIGHT SHIELD WITH A THROUGH HOLE FOR TRANSMITTING LIGHT ARRANGED BETWEEN AN OPTICAL LENS AND A MAIN CONTROL IC WAFER

CROSS-REFERENCE TO RELATED PATENT APPLICATION

This application claims priority to and the benefit of CN 201921231959.0, filed Jul. 30, 2019, entitled "IC Integrated Structure for Optical Mouse," by Jinfang OU. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The invention belongs to the field of assembly accessories of an optical mouse, and particularly relates to an IC integrated structure for the optical mouse.

BACKGROUND ART

With the development of electronic science and technology, a computer becomes an indispensable tool for our life and office, wherein a mouse, as a main input device of the computer, has a great impact on our operating efficiency. A mechanical mouse is adopted in the earliest years. The principle of the mechanical mouse is that a conductive rubber roller and a negative-electricity positioning shaft are used for positioning and moving, but the mechanical mouse is poor in accuracy, and so it is eliminated. At present, the most common mouse is a optical mouse, and the working principle of the optical mouse includes that a light emitting diode serves as a light source body and then the light is reflected to another photoelectric coupler to receive reflection. An optical sensor, an optical lens and the light emitting diode are essential components of the optical mouse.

In a conventional optical mouse, the three elements are usually installed inside the mouse separately. For example, a mouse with a wireless digital television receiver is disclosed in the application No. CN200720121993.3, wherein the mouse can provide the function of a normal optical mouse, but an installation structure in which an inner optical sensor, an optical lens and a light-emitting diode of the mouse are matched is separately assembled into the mouse due to the conventional optical mouse, and it is easy to cause the following defects. 1. Large occupied space increases the cost of a circuit board. 2. It is difficult for the suppliers of the three to achieve uniform assembly, and it is also difficult to achieve the ideal matching degree of the three, which will directly affect the working performance of the mouse. 3. At the same time, the assembly time of the three is very long, affecting the processing efficiency. 4. The lens is large in size, and the production cost of a professional manufacturer is high. 5. An LED wafer has a high follow-on production cost for an LED bead factory.

Therefore, a heretofore unaddressed need exists in the art to address the aforementioned deficiencies and inadequacies.

SUMMARY OF THE INVENTION

In order to overcome the defects of the prior art, the invention aims at an IC integrated structure for an optical mouse, which comprises a bracket configured for being connected with a PCB, an LED wafer for emitting light, a main control IC wafer and an optical lens; wherein the LED wafer and the main control IC wafer are respectively mounted at two ends of a terminal surface inside a bracket frame, the LED wafer and the main control IC wafer are connected with the PCB by the bracket, and the optical lens is mounted above the LED wafer and the main control IC wafer; a light shield configured for shielding an external light source is arranged between the optical lens and the main control IC wafer, and a through hole configured for transmitting light is formed in the light shield. According to the solution, the LED wafer, the main control IC wafer and the optical lens are integrated into a structure, with the size of the lens reduced and the structure of the light emitting source simplified, so that the occupied space of a product is smaller than that of the original product, the whole mouse is more convenient and fast to be assembled or disassembled, improving the production efficiency, and reducing the cost of raw materials; and meanwhile, the problem that the whole stability of the mouse is influenced due to unmatched accessories is solved by uniformly dismounting and mounting the LED wafer, the main control IC wafer and the optical lens.

The purpose of the invention is realized by the following technical solution.

The IC integrated structure for the optical mouse comprises a bracket for being connected with a PCB, an LED wafer for emitting light, a main control IC wafer and an optical lens; wherein the LED wafer and the main control IC wafer are respectively mounted at two ends of a terminal surface inside a bracket frame, the LED wafer and the main control IC wafer are connected with the PCB by the bracket, and the optical lens is mounted above the LED wafer and the main control IC wafer; a light shield configured for shielding an external light source is arranged between the optical lens and the main control IC wafer, and a through hole configured for transmitting light is formed in the light shield.

Further, the optical lens comprises a prism and a circular lens, the LED wafer is mounted below the prism, and the main control IC wafer is mounted below the circular lens; a light source emitted by the LED wafer is refracted to a tabletop through the prism, then reflected by the tabletop, and transmitted to the main control IC wafer through the circular lens.

Further, the through hole is correspondingly arranged at the center of a circle of the circular lens.

Further, the optical lens is made of resin.

Further, the bracket is provided with a circular truncated cone-shaped groove corresponding to a mounting position of the LED wafer, and the bracket is provided with a rectangular groove or a circular slot corresponding to a mounting position of the main control IC wafer.

Further, the two sides of the bracket are symmetrically provided with a plurality of pins for being connected with the PCB.

Further, the optical lens is fixed to the bracket in a buckling connection mode.

Compared with the prior art, the invention has the the following beneficial effects.

An IC integrated structure for an optical mouse of the invention comprises a bracket configured for being connected with a PCB, an LED wafer for emitting light, a main control IC wafer and an optical lens; wherein the LED wafer and the main control IC wafer are respectively mounted at two ends of a terminal surface inside a bracket frame, the LED wafer and the main control IC wafer are connected with the PCB by the bracket, and the optical lens is mounted above the LED wafer and the main control IC wafer; a light shield configured for shielding an external light source is arranged between the optical lens and the main control IC wafer, and a through hole configured for transmitting light is formed in the light shield. According to the solution, the LED wafer, the main control IC wafer and the optical lens are integrated into a structure, with the size of the lens reduced and the structure of the light emitting source simplified, so that the occupied space of a product is smaller than that of the original product, the whole mouse is more convenient and fast to be assembled or disassembled, improving the production efficiency, and reducing the cost of raw materials; and meanwhile, the problem that the whole stability of the mouse is influenced due to unmatched accessories is solved by uniformly dismounting and mounting the LED wafer, the main control IC wafer and the optical lens.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

Figure 1:
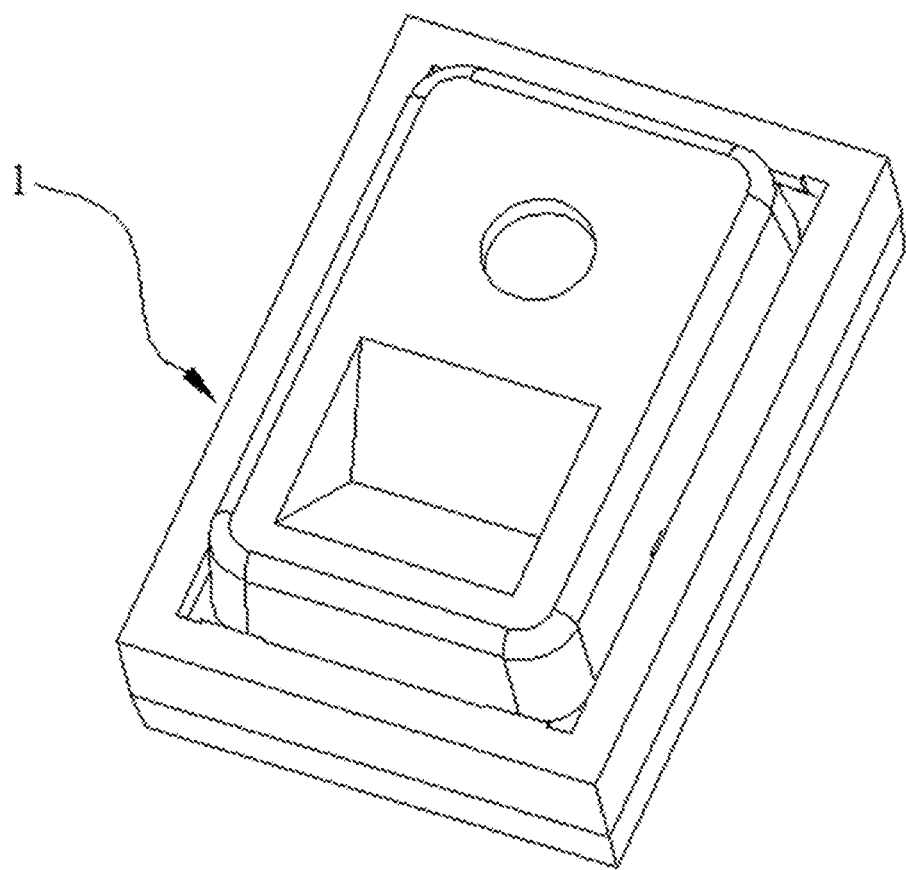
FIG. 1 is a structurally schematic view of a preferred embodiment of an IC integrated structure for an optical mouse according to the present invention.

In the drawings: 1, an IC integrated structure for an optical mouse; 2, a bracket; 22, a circular truncated cone-shaped groove; 23, a circular slot; 3, an LED wafer; 4, a main control IC wafer; 5, an optical lens; 51, a prism; 52, a circular lens; 6, a light shield; 61, a through-hole.

DETAILED DESCRIPTION OF THE INVENTION

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Embodiments of the invention are illustrated in detail hereinafter with reference to accompanying drawings. It should be understood that specific embodiments described herein are merely intended to explain the invention, but not intended to limit the invention. In accordance with the purposes of this invention, as embodied and broadly described herein, this invention, in certain aspects, relates to methods and systems for identification of bacteria in a biological fluid using Raman spectroscopy and applications of the same.

The present invention will now be further described with reference to the accompanying drawings and detailed description. It should be understood that any combination of the various embodiments or features described hereinafter may be used to form novel embodiments on the premise of no conflicts.

Figure 2:
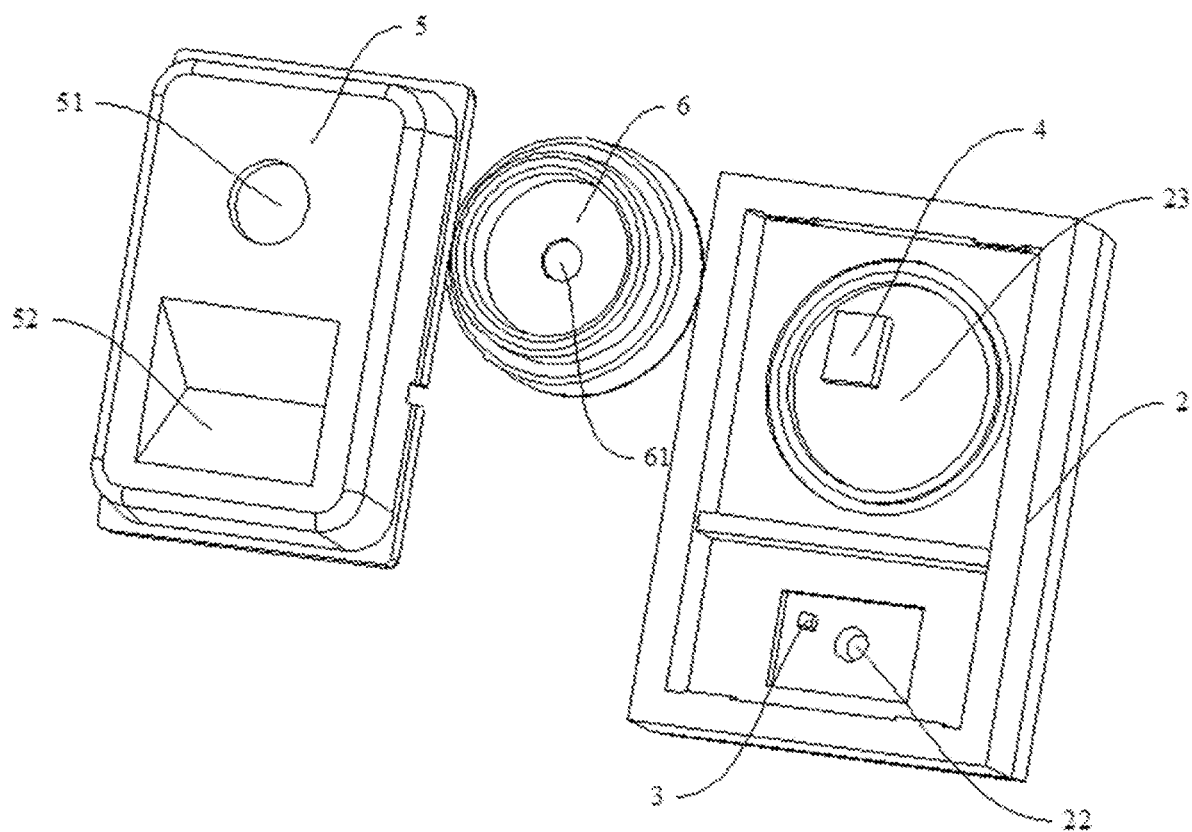
FIG. 2 is an exploded view of a preferred embodiment of the IC integrated structure for the optical mouse according to the present invention.

An IC integrated structure 1 for an optical mouse of the present invention is shown in FIGS. 1 and 2 and comprises a bracket 2 configured for being connected with a PCB, an LED wafer 3 for emitting light, a main control IC wafer 4 and an optical lens 5, wherein the main control IC wafer 4 and the optical lens 5 are respectively mounted at two ends of a terminal surface inside the bracket 2, and the LED wafer 3 and the main control IC wafer 4 are connected with the PCB by the bracket 2, and the optical lens 5 is mounted above the LED wafer 3 and the main control IC wafer 4; a light shield 6 configured for shielding an external light source is arranged between the optical lens 5 and the main control IC wafer 4, and a through hole 61 configured for transmitting light is formed in the light shield 6. The through hole 61 is correspondingly arranged at the center of a circle of the circular lens 51. Thus, receiving the light source emitted by the LED wafer 3 is not influenced while the external light source is shielded, so that the main control IC wafer 4 has a better light sensing effect.

According to the solution, the LED wafer 3, the main control IC wafer 4 and the optical lens 5 are integrated into a structure, only the LED wafer 3 is used as a light-emitting element, and other parts are omitted, so that the structure of the light-emitting source is reduced, the occupied space of a product is smaller than that of the original product; the PCB can save 40% of materials compared with a traditional mounting structure, and the whole mouse is more convenient and fast to be assembled or disassembled, improving the disassembly and assembly efficiency; and meanwhile, the problem that the whole stability of the mouse is influenced due to unmatched accessories is solved by uniformly dismounting and mounting the LED wafer, the main control IC wafer and the optical lens.

Due to the fact that the parts which are usually single in the three parts in the traditional mouse are respectively assembled on the mouse, the parts also have respective suppliers, the parts which are matched with each other need to be customized according to the needs of customers each time of production; and when the customers have problems in the using process, it is difficult to replace the matched parts, and the problem that the mouse is unstable after replacement exists. According to the solution, the three parts are integrated into a structure, and the disassembly and assembly are carried out uniformly; when in malfunction, there is no need to detect and check which parts are out of order, solving the problem that the mouse is unstable due to mismatching of all the parts.

The optical lens 5 comprises a prism 52 and a circular lens 51, the LED wafer 3 is mounted below the prism 52, and the light source sensor is mounted below the circular lens 51; the light source emitted by the LED wafer 3 is refracted to the desktop at the bottom of the mouse through the prism 52 in the use process, the light source is then reflected by the desktop, and the light source is transmitted to the main control IC wafer 4 in a centralized mode through the circular lens 51. By the above arrangement, the transmission of the light source can be met; and meanwhile, the light source is concentrated through the arrangement of the circular lens 51, so that the detection effect of the main control IC wafer 4 is better. The optical lens 5 is fixed on the support 2 in a buckling connection mode, so that the optical lens 5 can be prevented from falling off the bracket 2, and the whole structure is more stable.

The circular truncated cone-shaped groove 22 is formed at a mounting position of the bracket 2 corresponding to the LED wafer 3 in the embodiment, and a circular slot 23 is formed at a mounting position of the bracket 2 corresponding to the main control IC wafer 4. With the LED wafer 3 and the main control IC wafer 4 protected by the above structure, the LED wafer 3 and the main control IC wafer 4 can be prevented from falling off easily. The two sides of the bracket 2 are provided with a plurality of pins for being connected with the PCB. Thus, the bracket 2 is more stably connected with the PCB, and the LED wafer 3 and the main control IC wafer 4 on the bracket 2 can also be connected with the PCB. The number of pins of the structure can be changed according to different PCBs so as to be suitable for a mouse with different pin positions (such as 6-pins, 8-pins, 10-pins, 12-pins, 14-pins, 16-pins, 18-pins and the like).

While the above-described embodiments are merely preferred embodiments of the present invention, it is not intended to limit the scope of the present invention; and any insubstantial changes and substitutions made by those skilled in the art based on the present invention fall within the scope of the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An IC integrated structure for an optical mouse, comprising:
    a bracket for being connected with a PCB;
    an LED wafer for emitting light;
    a main control IC wafer; and
    an optical lens, wherein the LED wafer and the main control IC wafer are respectively mounted at two ends of a terminal surface inside a bracket frame;
    the LED wafer and the main control IC wafer are connected with the PCB by the bracket, and the optical lens is mounted above the LED wafer and the main control IC wafer;
    a light shield configured for shielding an external light source is arranged between the optical lens and the main control IC wafer, and
    a through hole configured for transmitting light is formed in the light shield.

2. The IC integrated structure for the optical mouse of claim 1, wherein the optical lens comprises a prism and a circular lens, the LED wafer is mounted below the prism, and the main control IC wafer is mounted below the circular lens; a light source emitted by the LED wafer is refracted to a tabletop through the prism, then reflected by the tabletop, and transmitted to the main control IC wafer through the circular lens.

3. The IC integrated structure for the optical mouse of claim 2, wherein the through hole is correspondingly arranged at the center of a circle of the circular lens.

4. The IC integrated structure for the optical mouse of claim 1, wherein the optical lens is made of resin.

5. The IC integrated structure for the optical mouse of claim 1, wherein the bracket is provided with a circular truncated cone-shaped groove corresponding to a mounting position of the LED wafer, and the bracket is provided with a rectangular groove or a circular slot corresponding to a mounting position of the main control IC wafer.

6. The IC integrated structure for the optical mouse of claim 1, wherein the two sides of the bracket are symmetrically provided with a plurality of pins for being connected with the PCB.

7. The IC integrated structure for the optical mouse of claim 1, wherein the optical lens is fixed to the bracket in a buckling connection mode.

\* \* \* \* \*